Aug. 9, 1949.  E. F. SCHMIDT  2,478,714
JETTISONABLE COCKPIT CANOPY
Filed Dec. 28, 1945  4 Sheets-Sheet 1
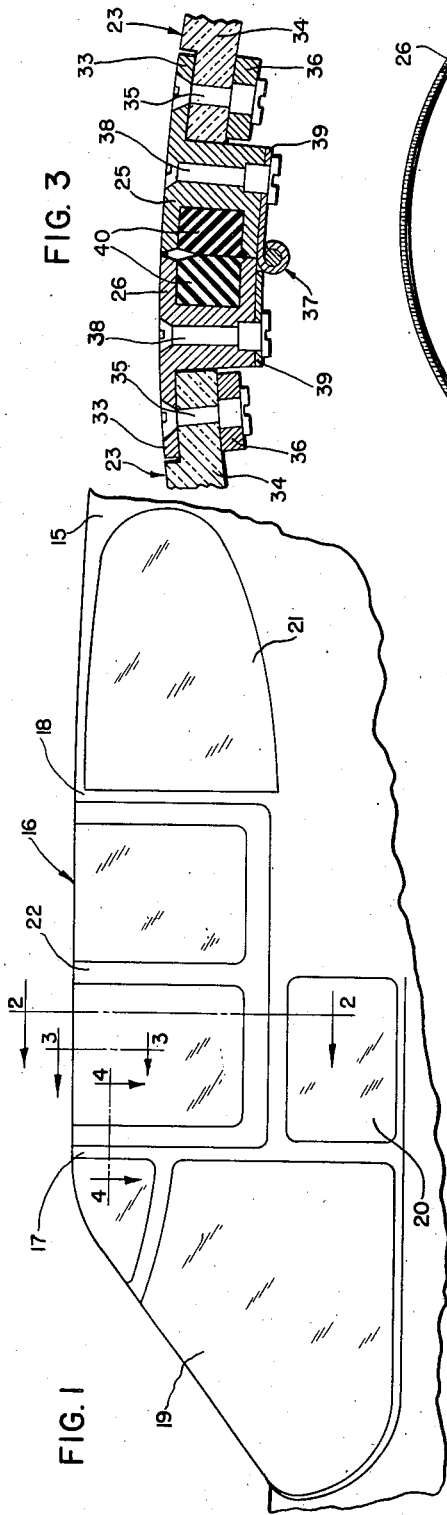
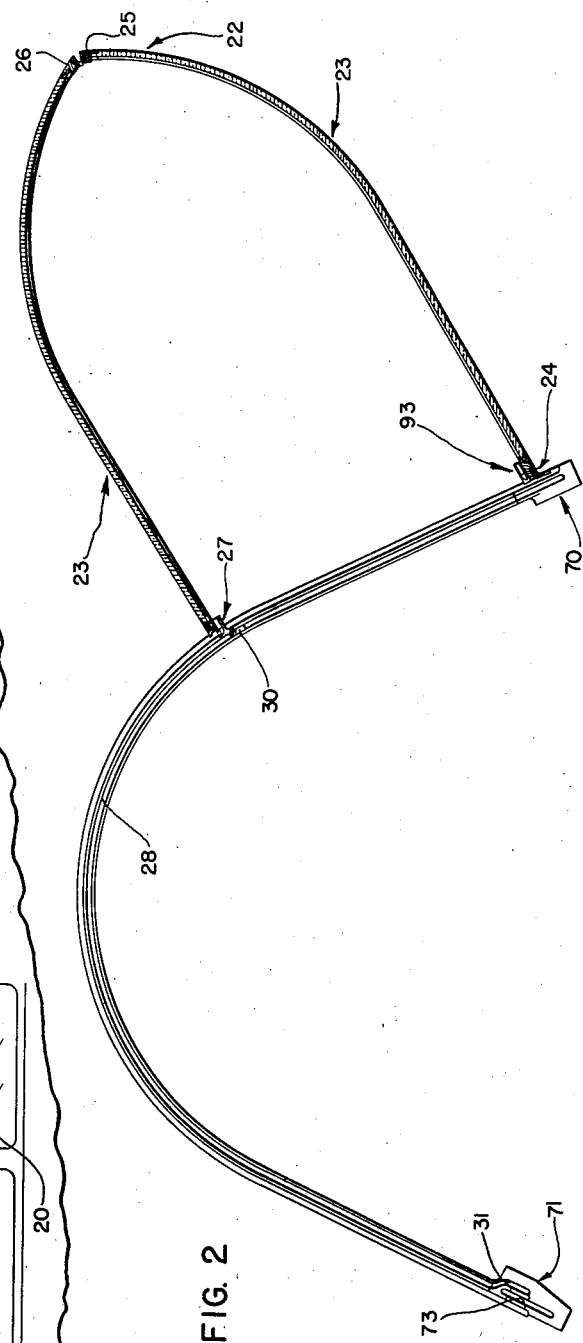
INVENTOR.
EUGENE F. SCHMIDT
BY
*Richard W. Treverton*
ATTORNEY Aug. 9, 1949.  E. F. SCHMIDT  2,478,714
JETTISONABLE COCKPIT CANOPY
Filed Dec. 28, 1945  4 Sheets-Sheet 2

INVENTOR.
EUGENE F. SCHMIDT
BY
Richard W. Treverton
ATTORNEY

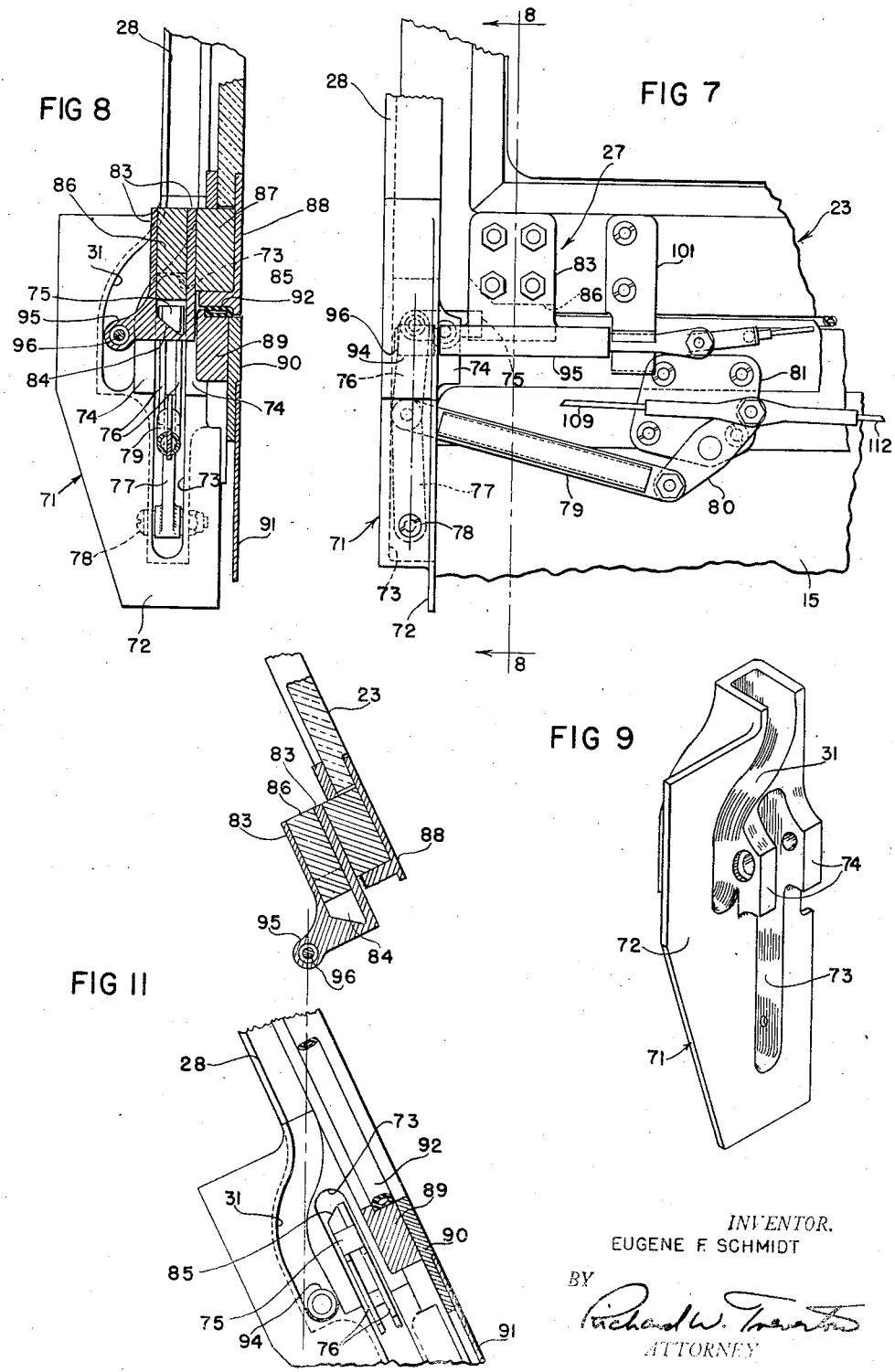

Aug. 9, 1949.　　　　　E. F. SCHMIDT　　　　　2,478,714
JETTISONABLE COCKPIT CANOPY
Filed Dec. 28, 1945　　　　　　　　　　　　4 Sheets-Sheet 4
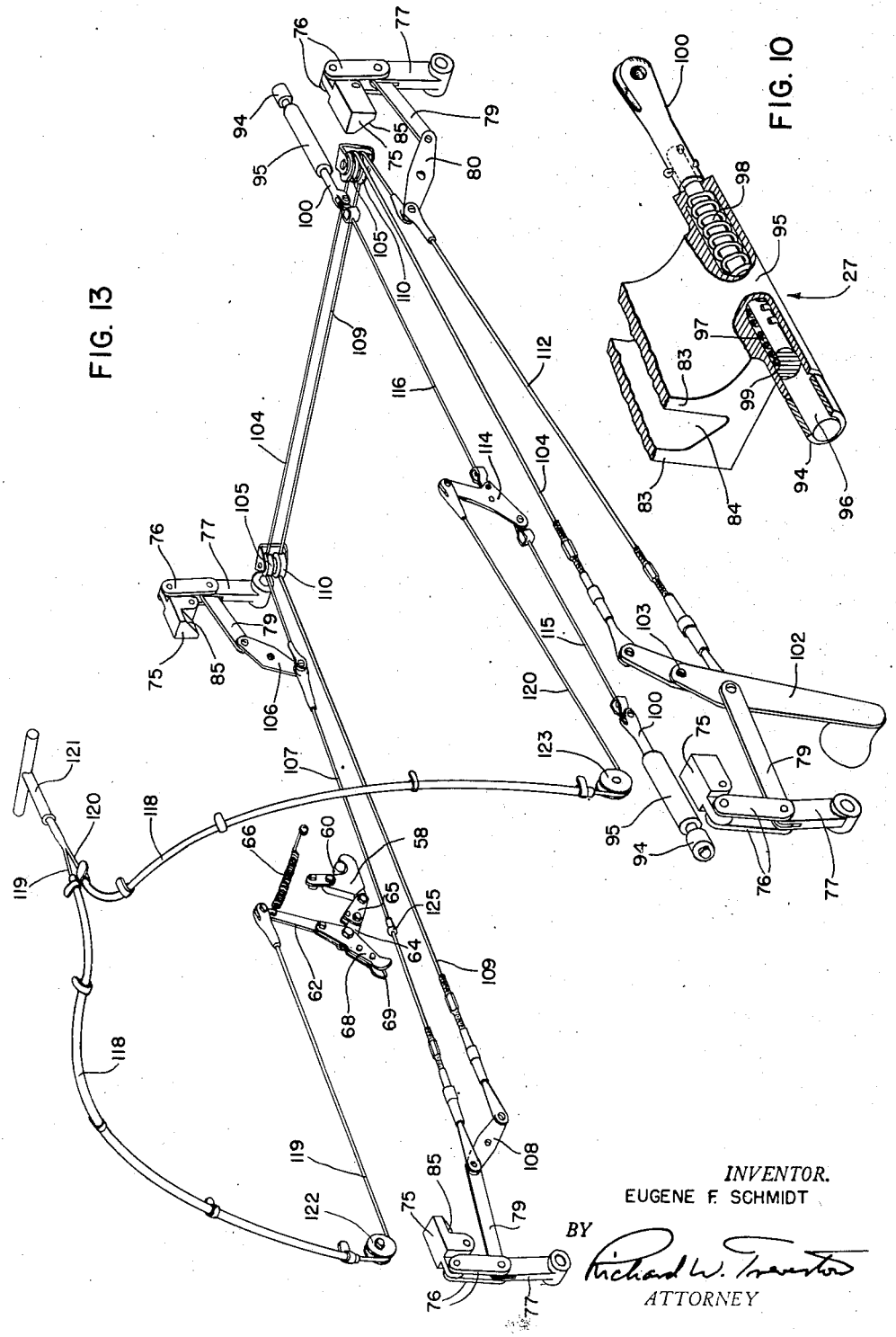
INVENTOR.
EUGENE F. SCHMIDT
BY
Richard W. Treanton
ATTORNEY Patented Aug. 9, 1949

2,478,714

UNITED STATES PATENT OFFICE 2,478,714

JETTISONABLE COCKPIT CANOPY

Eugene F. Schmidt, New York, N. Y., assignor to Curtiss-Wright Corporation, a corporation of Delaware Application December 28, 1945, Serial No. 637,599

13 Claims. (Cl. 244—121)

This invention relates to aircraft construction and has particular reference to an improved mounting and operating arrangement for a cockpit canopy.

The demand for high altitude aircraft has imposed certain important and critical problems relating to the provision of pressurized areas within the aircraft for the safety of flight personnel. It is known that pilots and other crew members can perform their assigned duties with no appreciable loss of efficiency if a certain minimum pressure is maintained within the aircraft over the exterior pressure level encountered at high altitudes.

In certain types of aircraft where reduction in structural weight is an important factor it is especially difficult to provide a suitable and relatively simply sealed pressurized cockpit. In addition to the weight problem aircraft, when in flight, develop forces on the cockpit canopy tending to expand and lift the latter away from its seat. A pressurized cockpit increases the force tending to lift and unseal the canopy as there is a greater internal pressure level. Therefore, the normal forces acting on the canopy, when the aircraft is in flight, combined with pressurization of the cockpit will tend to defeat the attainment of the desired sealed cockpit conditions for high altitude aircraft when employing known cockpit and canopy structures.

An object of the invention is to be found in the provision of a cockpit closure means or canopy which may be secured in closed position and effectively sealed against loss of pressure.

An object is to be found in improved means for drawing the canopy structure into a sealed position over the cockpit and for locking the same against yielding with the cockpit pressurized relative to external pressure conditions.

Still a further object resides in the canopy locking means which means is rendered effective to increase the force applied to the canopy for holding it in seated position as the difference between internal and external pressure increases.

Another object resides in the arrangement of operating means for the canopy locking means such that the canopy normally may be opened readily for access to the cockpit.

Yet a further object is to be found in the improved arrangement for attaching the canopy to the fuselage whereby the same may be hinged for opening and closing movement as well as easily detached from the fuselage.

It is also an object to provide an emergency operating system for detaching the canopy while in flight so that it may be jettisoned in the event the pilot is forced to abandon the aircraft.

The foregoing objects as well as other objects and advantages will be more particularly pointed out in the following detailed description of but one embodiment of this invention which is disclosed by way of example only.

In the drawing:

Figure 1 is a fragmentary side elevational view of an aircraft fuselage showing the cockpit fully closed by a canopy;

Figure 2 is a transverse partial sectional elevation through the fuselage showing the forward arched structure and the canopy folded into open position, the view being taken at line 2—2 in Figure 1;

Figure 3 is a fragmentary sectional detail of the canopy hinge structure located at the longitudinal folding line and intermediate the lateral margins thereof, this view being taken at line 3—3 in Figure 1;

Figure 7 is an enlarged and fragmentary view of canopy locking and guiding means as seen on the left side of the cockpit and at the rear fuselage arch structure;

Figure 8 is a sectional elevational view of the structure of Figure 7 when in assembled, closed position, the section being taken at line 8—8 of Figure 7;

Figure 9 is a perspective view of a suitable fitting means for use in connection with the canopy securing means;

Figure 10 is a greatly enlarged partly sectioned perspective view of a typical canopy roller assembly which engages the guide track structure carried by the fuselage arches;

Figure 11 is a view somewhat similar to Figure 8 but with the parts in a true angular relation in order to illustrate the relative motion of the canopy when jettisoned;

Figure 13 is a perspective view of the operating system for the canopy holding and releasing means, it being evident that supporting structure has been eliminated from this view for the sake of clearness and to aid in understanding its operation.

Figure 5:
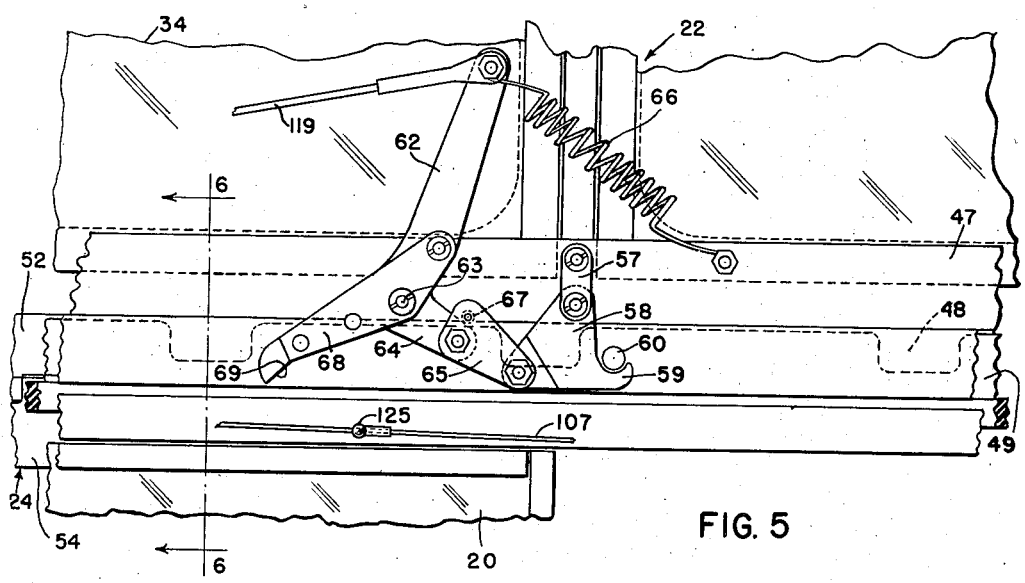
Figure 5 is an enlarged but fragmentary elevational view, from the interior of the cockpit and as seen to the right of the pilot when seated, of the canopy and hinged attachment structure together with certain portions of the release operating mechanism.

In the example disclosed in the drawing at Figure 1 the aircraft fuselage 15 is provided with a cockpit 16 which is defined at its forward zone by an arched structure 17 and at its rearward zone by the arched structure 18. This cockpit is provided with a windshield 19 of any suitable construction, side walls having transparent panels 20 at each side of the forward zone, and rear vision cutouts which are closed by transparent panels 21. The cockpit between the fore and aft arched structures is adapted to be closed by a foldable two-part canopy structure 22 which in its closed position is conformable with the arch contour.

In Figure 2 the canopy 22 is illustrated in its open position so that the foldable parts 23 thereof may be seen. It appears that one part of the canopy is connected at one side of the fuselage by means of a hinge structure 24 later to be described in connection with Figures 5 and 6. The two parts of the canopy are hingedly connected at an intermediate point by means of channel shaped longitudinally extending members 25 and 26, while the moving part is provided at its forward and rearward corners with suitable bracket means 27, one being shown in Figures 2 and 10, for supporting roller means which engage with guide tracks 28 fixed in the arch structures 17 and 18. In this connection the roller means is adapted to rest against a stop block 30 placed at a suitable point in the track for arresting the canopy in its full open position. When fully closed this same roller means is caused to ride into an inwardly offset track portion 31 so that the final closing movement of the canopy will bring it into a sealed position as will be later described.

Figure 3 is a detailed view of the hinged connection between the relatively foldable parts 23 of the canopy 22. The longitudinal channel members 25 and 26 each have a flange 33 to which the transparent panels 34 are suitably attached by securing elements 35 and backing strips 36. A hinge 37 is secured to these channel members with its hinging axis at the parting line between the two parts of the canopy. Securing elements 38 are provided for attaching the respective plate portions 39 of this hinge to the members 25 and 26. The channel members are placed in facing relation so that suitable resilient pressure sealing strips 40 may be brought into compressed relation upon closure of the canopy.

Figure 4:
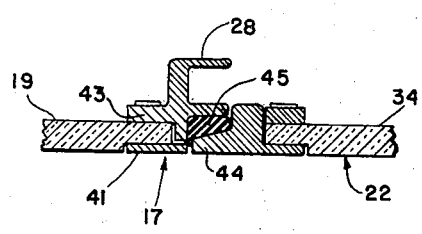
Figure 4 is a further fragmentary sectional view showing a typical canopy guide track assembly associated with the forward and rearward fuselage arched structures, the view being seen along line 4—4 in Figure 1.

The track or guide asembly for the forward arch structure 17 is shown in Figure 4 as comprising the member 41, transparent panel attachment means 43 and a suitably formed inwardly extending track 28. The canopy margin along this arch is formed by a tapered flanged frame means 44 adapted to provide support for the transparent panel 34. A resilient pressure sealing strip 45 is provided at the joint or seam between the track and this frame means.

Figure 6:
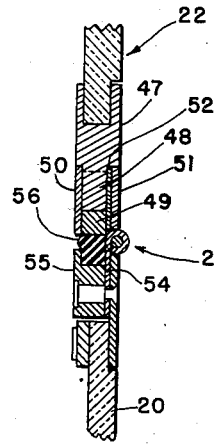
Figure 6 is a sectional detailed view of a part of the hinged structure as seen along line 6—6 in Figure 5.

The hingeable attachment structure for the canopy may best be seen in Figures 5 and 6. In general, the canopy is provided along its lower right hand margin with a bar member 47 on which spaced teeth 48 project downwardly to intermesh with recesses formed in a matching bar member 49. These members are confined to a common plane by an inner fuselage strip 50 and an outer fuselage strip 51 set outside the plate portion 52 of the upper half of the canopy hinge 24. The lower hinge plate 54 is fixed to suitable fuselage members such as the longitudinal member 55 which is notched at its upper edge to receive a resilient pressure sealing strip 56 for contact with the lower edge of the member 49 when the canopy is closed. These views also show a panel 20 below the hinge structure while in Figure 1 a similar lower panel 20 is shown thus indicating the provision of visibility openings at each side of the cockpit.

From what has just been said it is clear that the hinge plate 52 provides the anchor means for retaining the bar member 49 on the fuselage. Thus the canopy and attached bar member 47 may be lifted away from the fuselage in the absence of holding means therefor. A suitable releasable holding means has been shown in Figure 5 and this includes an anchor clip 57 carried on the canopy for the pivotal mounting of a detent element 58, the latter having a hooked formation 59 which engages a fixed pin 60 on the hinge structure carried by the fuselage. When the detent hook 59 engages the pin 60, as shown, the canopy may not be lifted away from the fuselage. However, the detent element 58 may be moved to disengage pin 60 by means of a lever 62 pivoted at 63 on the canopy so that an integral arm 64 extends toward the detent for articular connection therewith through a link 65. Since the lever 62 is urged in a clockwise direction at all times by the spring 66, the link 65 is provided with a stop pin 67 to abut the arm 64 when the several parts of this system have reached locking position as shown. The lever 62 is also provided with a second arm 68, the outer end of which is bifurcated to provide an engagement seat 69 for means later to be described.

In Figures 7 and 8 there is shown a typical assembly of the means provided for securing the canopy in closed position. These particular views are for the rear left hand corner of the movable canopy portion as it would be seen by the pilot when seated in the cockpit. The forward left hand corner assembly is briefly shown in connection with Figure 2. Certain parts of this assembly are further shown in detail in Figures 9 and 10 and in the following description reference should be made to these views.

In Figure 8 the fuselage structure 15 carries a fitting 71 attached in any suitable manner at its face plate 72. This fitting 71 (Figure 9) is formed with the recessed, curved track portion 31 for cooperation with the arch track 28, and a slot or recess 73. A pair of projecting spaced lugs 74 are formed at the margins of the slot. It should be noted that the fitting shown in Figure 9 is formed for the left rear corner of the fuselage, and that the forward fitting member (Figure 2) is accordingly reversely formed but is otherwise identical. The fittings 71 carry a canopy holding element 75 pivotally mounted between the lugs 74 for swinging movement into or out of the slot 73. In Figure 7 the element 75 is shown in its holding position or projecting outwardly of the slot 73. The rearward end of the element 75 is pivotally connected to a first pair of spaced toggle links 76 (see Figure 13), these links being pivotally connected to embrace a second toggle link 77 which is in turn pivoted at 78 in the lower end of slot 73. An operating link 79 is pivotally connected at the joint between the first and second toggle links and this operating link extends to a crank element 80 which is pivoted on a fuselage bracket plate 81. The opposite end of the crank 80 is associated with means later to be described. However, the depth of the slot 73 in which the toggle links operate is such that the common link joint may move into the slot to carry the links beyond dead center position. Thus the holding element 75 may not be moved out of its holding position shown in Figure 7 until the link 79 is moved to the left to carry the toggle links through dead center and in a direction outwardly of the recess 73.

The canopy portion 23 carries a bracket structure 27 near the corner thereof and in position to receive the holding element 75 between upwardly extending side members 83. The lower end wall 84 between these side members is directed at an angle or beveled to match the beveled face 85 of the element 75 received in the bracket (see Figures 8, 11 and 13). The upper area between the bracket side members 83 is filled in by a block 86, the lower edge having been cut away sufficiently to allow free swinging movement of the element 75 into and out of the bracket 27.

It will also be noted in connection with Figure 8 that the canopy carries a stiffener bar 87 behind a flanged frame member 88. The fuselage structure in the zone of the parting plane of the canopy is provided with a flanged member 89 and a skirt plate 90 to which fuselage skin plates 91 are secured. The flanged edge faces of the members 88 and 89 are adapted to retain a resilient pressure sealing strip 92 therebetween, it being preferred that the strip be suitably secured to the fuselage member 89.

The normal opening movement of the canopy is guided by means of a releasable roller assembly carried in the bracket 27 and having a roller 94 operably engaged in track 28. This assembly (Figure 10) is supported in a tubular housing 95 integral with the bracket and comprises a pin 96 slidable in the bore 97 of housing 95, a coiled spring 98 encircling the inner reduced diameter of pin 96 and abutting the rear end wall of the bore 97 for compression by the shoulder 99 on the pin 96 when the pin is retracted, and a clevis end fitting 100 which slides over the reduced end of the pin 96 and is keyed thereto in a suitable position to limit the movement of the pin under spring urging. When properly assembled the pin 96 forms a bearing for the roller 94 and this pin bearing normally is retained in bearing support of the roller by spring 98. However, the pin 96 can be retracted to release the roller by means of a cable attached to the clevis fitting 100 as will appear presently. A supporting clip element 101 is provided to prevent excessive lateral displacement of the clevis when the latter is moved against the spring 98 to retract pin 96.

During the normal closing movement of the canopy the last part of its travel is guided by the off-set track 31 in fittings 71. The roller 94 moves into the track 31 and simultaneously draws the canopy member 88 inwardly until it lines up with the fuselage member 89 and compresses the sealing strip 92. At the same time the bracket 27 is moved inwardly until the slotted space between side portions 83 registers with the slot 73 in the fitting 71. When this is done the holding element 75 may be pivoted out of the slot 73 and into the bracket slot so that the beveled face 85 thereof will bear down upon the sloping face 84 of the bracket and exert sufficient load to place the canopy in tension and particularly stress the straight side sections thereof.

Figure 12:
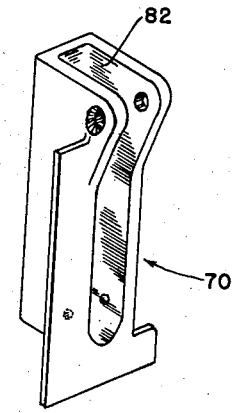
Figure 12 is a perspective view of a suitable fitting for use in connection with the canopy securing means.

In Figure 12 there is shown a fitting member 70 which is carried at the right side of the cockpit and is set into the forward arch structure 17 so that the rectilinear slot 82 is in alignment with a slot in fitting 93 fixed on the canopy 22. Fitting 70 supports the toggle link mechanism for operating the associated holding means 75. An oppositely formed but similar fitting (not shown) is carried at the right rear side of the fuselage for the same purpose.

Figure 11 illustrates the manner in which the canopy may be released from the fuselage. It will be noted that the holding element has been pivoted to lie within the slot 73 and that the roller 94 has dropped to the bottom of the track section 31. This latter action disengages the canopy from any further guidance by the track means. The pilot of the aircraft may very easily and quickly release the canopy 22 in an emergency, it being understood that slip stream forces will suffice for the actual removal once the elements 75, roller means 94 and detent plate 58 have been operated to free the canopy.

The operating system for each of the latter canopy holding and guiding means has been shown in a diagrammatic perspective view in Figure 13. In this view it must be remembered that the canopy 22 (Figure 1) will normally open upwardly to the left, that the holding means 75 at the lower front and upper right are at the left side of the cockpit and are supported in the fore and aft fittings 71 (Figures 7, 8 and 9), that the guide rollers 94 are carried in the bracket means 27 at the fore and aft margins of the left side of the canopy, that the holding means 75 to the left and above are at the right side of the fuselage and that detent 58 and its operating lever 62 are mounted on the canopy as particularly shown in Figure 5.

With these facts in mind it will be clear that the master crank 102, which is pivotally mounted on the fuselage at 103 and connected to the toggle operating arm 79 below this pivot, will upon counterclockwise rotation release the toggle links 76 and 77 from over center locking position and pivot the left front element 75 out of canopy holding position. Simultaneously a run around cable system 104 attached to the upper end of the crank 102 will, through pulley wheels 105, operate a crank lever 106 to release the right rear toggle links and associated holding element 75. From crank 106 a short cable 107 runs forward to connect with arm 79 and crank lever 108 at the right forward corner of the fuselage cockpit. The crank 108 releases the toggle links and associated holding element 75 and simultaneously draws on a cable 109 which, through pulleys 110 mounted on common axes with pulleys 105 adjacent thereto, moves the crank lever 80 to release the left rear toggle links and holding element 75. A short cable 112 extends from crank 80 to the master crank 102 to complete the cable run around system. Thus counterclockwise master crank motion will free the canopy for normal opening movement about the hinge structure 24 (Figure 2). At this time the rollers 94 guide the canopy in the fore and aft tracks 28 (Figures 2 and 8) carried by the fuselage arch structures.

A release system associated with the retractable pins for the track rollers 94 comprises a common plate member 114 suitably pivoted on the inner surface of the canopy, a cable 115 extending forwardly to the clevis fitting 100 and a second cable 116 extending rearwardly to the rear clevis fitting 100. Counterclockwise rotation of the plate 114 will retract pins 96 and free the canopy from any further guidance in tracks 28.

The canopy emergency releasing system includes a divided cable system carried in branch guide tubes 118 attached to the under side of the canopy. The cables 119 and 120 are affixed to a common pull handle 121 and this latter assembly is best mounted near the overhead longitudinal hinge 37 (Figure 3) so as not to interfere with the normal opening and closing movement of the canopy. The cable 119 extends under a pulley 122 and connects at the upper end of the hinge release lever 62. The opposite cable 120 passes beneath a pulley 123 and connects with the plate member 114. It will be evident that the spring 66 at lever 62 and the springs 98 in each of the roller pin housings 95 will act to urge the canopy emergency release cable system toward non-operative position.

In the above described system for operating the various elements associated with the canopy, it will be evident that master crank 102 will control the opening as well as the closing of the four holding elements 75 since the cable systems associated therewith are closed in both directions of movement or crank rotation. Crank 102 is independent of the emergency release system which is a great advantage in reducing pilot's confusion as to which system is for normal use.

The canopy emergency release system is simultaneously operative, when handle 121 is pulled, to release the canopy hinge connection, release the roller guide means and open the canopy holding elements 75 so that the entire canopy can be blown off or jettisoned in flight. The last of these emergency release operations is effected through the forked arm 68 of the lever 62 for the hinge securing detent 58. In Figure 13 it can be seen that the arm 68 moves in the direct line of cable 107 and also swings in an arcuate path which intercepts this cable (Figure 5). With this relationship established the seat 69 at the end of the lever 68 will move into engagement with a ball element 125 which has been swaged fast on the cable 107 at the proper point with the canopy in seated, closed position. When the seat 69 and ball 125 engage the resulting movement will open all of the elements 75 at the same time detent 58 and pins 96 are being moved to release the canopy.

In the foregoing description it appears that the canopy 22 may be hingedly moved to one side of the cockpit to open the latter, and in so doing the two parts 23 thereof fold one upon the other. It also appears that when the canopy is closed the off-set tracks 31 in fittings 71 will force the canopy margins against the sealing strips creating an initial pressure seal. To assure an adequate seal for cockpit pressurization the holding means 75 and cooperating slotted fittings 27 and 93 are suitably formed with matching inclined contact surfaces, such as face 85 on means 75, face 84 in fittings 27, and similar faces in fittings 93, secured to bar 47, for the purpose of increasing the tightness of the canopy seal. These inclined maching surfaces are also effective in opposing any tendency for the canopy to lift away from its seat in view of the higher internal pressure. Any canopy movement will cause slippage along the plane of these inclined faces and due to the fixed nature of means 75 the canopy will necessarily be drawn more tightly about the cockpit. Maintenance of canopy sealing position is thus positively assured and in the case of a non-circular canopy the holding effect is even more pronounced and beneficial.

While the above described canopy assembly and operating system has been given by way of example only it will be understood that the scope hereof shall be taken to include all equivalent parts and assembly arrangements which come within the spirit of the claims hereafter appended.

What is claimed is:

1. In an aircraft fuselage having longitudinally spaced arched structures defining the fore and aft margins of a cockpit opening, a canopy releasably but hingedly connected to the fuselage between the arched structures at one side of the cockpit, said canopy being movable from an open position to a closed position in which it conforms to the arched structures, means for holding said canopy in its closed position, first means carried by the fuselage and normally operable to release said holding means to permit opening said canopy, and second means carried by said canopy for operation to release the canopy hinge connection and operate said first means to release said holding means whereby said canopy may be jettisoned in an emergency.

2. In an aircraft fuselage providing longitudinally spaced arched structures defining the fore and aft margins of a cockpit opening, a hinge structure operably secured at one side of the cockpit opening, a canopy releasably attached to said hinge structure for movement between an open position and a position to extend between and conform to the arched structures for enclosing the cockpit, securing means operably carried in said arched structures for engaging the canopy to lock the same in closed position, means connected with said securing means for operating the latter to permit said canopy to be moved to open position about said hinged structure, and emergency canopy releasing means which is operable to release said canopy from attachment to said hinge structure and simultaneously actuate said last means to release said securing means from engagement with said canopy whereby the latter may be jettisoned from the aircraft.

3. In an aircraft fuselage constructed with a cockpit having an arched structure at the fore and aft margins thereof, a canopy, conformable to the arched structure when in cockpit closing position, mounted on the fuselage for hinging movement to open the cockpit, a hinge structure carried by the fuselage, means for releasably securing said canopy to said hinge structure, lockable means carried by the fuselage for engaging said canopy to secure the latter in closed position, means operably connected to said lockable means normally for unlocking the canopy when it is desired to open the cockpit, and emergency means carried by said canopy in position to operate said last mentioned means and said releasable means for said hinge structure whereby said canopy may be disconnected from the aircraft for jettisoning by slip stream forces with the aircraft in flight.

4. In an aircraft fuselage providing a cockpit, a cockpit canopy, a hinge structure at one side of the cockpit to which said canopy is releasably attached, lockable means carried by the fuselage for engagement with said canopy to secure the latter in closed position, a first control system for operating said lockable means to release the canopy for normal hinging movement to open the cockpit, and a second control system carried by said canopy and operably arranged to actuate said first system and release the canopy attachment to said hinge structure for emergency jettisoning of the canopy.

5. In an aircraft fuselage providing a cockpit, a cockpit canopy; a hinge structure at one side of the cockpit to which said canopy is releasably attached; means on the fuselage for guiding said canopy between open and closed positions; means on the canopy for detachably connecting said canopy with said guide means; lockable means carried by the fuselage for engagement with said canopy to secure the latter in closed position; a first control system for operating said lockable means to release the canopy for normal hinging movement to open the cockpit; and a second control system carried by said canopy and operably arranged to detach the means on said canopy from said guiding means, to actuate said first system, and to release the canopy attachment to said hinge structure for emergency jettisoning of the canopy.

6. In aircraft, a fuselage having arched structures which define the fore and aft margins of a cockpit opening, a canopy hingedly mounted on the fuselage at one side of the cockpit, said canopy being movable between a cockpit closing position in which it conforms to said arched structures and a cockpit open position in which it is located at one side, a plurality of holding elements swingably mounted on said fuselage for movement into engagement with said canopy when the latter is in closed position, and means operatively adapted simultaneously to swing all of said holding elements into engagement with said canopy, said last means including a plurality of toggle link assemblies operatively connected one to each holding element for locking the latter in canopy holding position.

7. In aircraft, a fuselage having arched structures which define the fore and aft margins of a cockpit opening, a canopy releasably hingedly mounted on the fuselage at one side of the cockpit, said canopy being movable between a cockpit closing position in which it conforms to said arched structures and a cockpit open position in which it is located at one side, a plurality of holding elements swingably mounted on said fuselage for movement into engagement with said canopy when the latter is in closed position, means operatively adapted simultaneously to swing all of said holding elements into engagement with said canopy, said last means including a plurality of toggle link assemblies operatively connected one to each holding element for locking the latter in canopy holding position, and means operatively mounted on said canopy for releasing said canopy hinge connection and for operating said last mentioned means to move said toggle link assemblies out of locking position whereby said canopy may be released from the fuselage.

8. In aircraft, a fuselage having arched structures which define the fore and aft margins of a cockpit opening, a canopy hingedly mounted on the fuselage at one side of the cockpit, said canopy being movable between a cockpit closing position in which it conforms to said arched structures and a cockpit open position in which it is located at one side, guide tracks carried one on each arched structure, roller elements carried by said canopy for engagement in said tracks to guide the canopy in its movement between said positions, a plurality of holding elements swingably mounted on said fuselage for movement into engagement with said canopy when the latter is in closed position, and means operatively adapted simultaneously to swing all of said holding elements into engagement with said canopy, said last means including a plurality of toggle link assemblies operatively connected one to each holding element for locking the latter in canopy holding position.

9. In aircraft, a fuselage having arched structures which define the fore and aft margins of a cockpit opening, a canopy releasably, hingedly mounted on the fuselage at one side of the cockpit, said canopy being movable between a cockpit closing position in which it conforms to said arched structures and a cockpit open position in which it is located at one side, guide tracks carried one on each arched structure, roller elements detachably carried by said canopy for engagement in said tracks to guide the canopy in its movement between said position, a plurality of holding elements swingably mounted on said fuselage for movement into engagement with said canopy when the latter is in closed position, means operatively adapted simultaneously to swing all of said holding elements into engagement with said canopy, said last means including a plurality of toggle link assemblies operatively connected one to each holding element for locking the latter in canopy holding position, and means operatively mounted on said canopy for releasing said canopy hinge connection for detaching said roller elements and for operating said last mentioned means to move said toggle link assemblies out of locking position whereby said canopy may be released from the fuselage.

10. In an aircraft structure having a cockpit with side walls and spaced substantially arched members extending between said side walls, the combination therewith of a track extending along each of said substantially arched members, a canopy comprising hinged sections adapted when closed to be supported upon said substantially arched members with a first canopy section adjacent one side wall and a second canopy section adjacent the other side wall, a member extending along the first canopy section and hinged to said one side wall, latch means detachably securing said member to the first canopy section, rollers engaging said tracks, roller mount means detachably connecting said rollers to the second canopy section, clamping means for releasably securing said first and second canopy sections to the side walls respectively adjacent to them, means carried by the aircraft structure including a member operable by an occupant for releasing said clamping means to enable normal opening of the canopy with said rollers operating on said tracks and said first canopy section having hinge movement relative to the aircraft structure as a unit with said member, and emergency release means carried by the canopy including another occupant operable member for releasing said latch means and the roller mount means and for simultaneously releasing said clamping means to jettison the canopy.

11. In an aircraft structure having a cockpit, the combination therewith of: a cockpit canopy; a hinge structure at one margin of the cockpit releasably and hingedly attaching the canopy to the aircraft structure; means on the aircraft structure for guiding the canopy for normal hinge movement between open and closed positions; means detachably connecting the canopy with said guide means; locking means for releasably securing the canopy when closed to the aircraft structure; a first control system for operating said locking means to release the canopy for normal opening hinge movement; and a second control system arranged to operate said means detachably connecting the canopy to release the latter from said guide means, to release the attachment of the canopy at said hinge structure, and to operate said first control system, for jettisoning the canopy.

12. In an aircraft structure having a cockpit, the combination therewith of a cockpit canopy, a hinge connection releasably securing the canopy to the aircraft structure, said hinge connection providing for hinge movement of the canopy to open the cockpit, locking means for releasably securing the canopy when closed to the aircraft structure, a first control system for releasing said locking means to free the canopy for hinging movement to open the cockpit, and a second control system for releasing said hinge connection and also for releasing said locking means to provide for jettisoning of the canopy.

13. In an aircraft structure having a cockpit, the combination therewith of a cockpit canopy, track means on the aircraft structure, guide elements for the canopy engaging the track means for guiding the canopy for normal movement between open and closed positions, means releasably connecting the guide elements to the canopy, locking means for releasably securing the canopy when closed to the aircraft structure, a first control system for releasing said locking means to free the canopy for normal opening movement, and a second control system for releasing said means connecting the guide elements to the canopy and also for releasing said locking means to provide for jettisoning of the canopy.

EUGENE F. SCHMIDT.

REFERENCES CITED

The following references are of record in the file of this patent:

UNITED STATES PATENTS

| Number | Name | Date |
|---|---|---|
| 2,351,859 | Kaiser | June 20, 1944 |
| 2,403,250 | Verhagen | July 2, 1946 |

FOREIGN PATENTS

| Number | Country | Date |
|---|---|---|
| 547,585 | Great Britain | Sept. 2, 1942 |
| 699,065 | Germany | Nov. 22, 1940 |